(12) United States Patent
Kalampoukas et al.

(10) Patent No.: US 7,155,473 B2
(45) Date of Patent: Dec. 26, 2006

(54) HIGH-SPEED PARALLEL-PREFIX MODULO $2^N-1$ ADDERS

(75) Inventors: Lampros Kalampoukas, Hoboken, NJ (US); Costas Efstathiou, Athens (GR); Dimitris Nikoloo, Patras (GR); Haridimos T. Vergos, Patras (GR); John Kalamatianos, Arlington, MA (US)

(73) Assignee: UTStarcom, Inc., Rolling Meadows, IL (US)

( * ) Notice: Subject to any disclaimer, the term of this patent is extended or adjusted under 35 U.S.C. 154(b) by 726 days.

(21) Appl. No.: 10/333,394

(22) PCT Filed: Jul. 16, 2001

(86) PCT No.: PCT/US01/22247

§ 371 (c)(1),
(2), (4) Date: Jan. 17, 2003

(87) PCT Pub. No.: WO02/08885

PCT Pub. Date: Jan. 31, 2002

(65) Prior Publication Data

US 2004/0128339 A1    Jul. 1, 2004

Related U.S. Application Data

(60) Provisional application No. 60/219,856, filed on Jul. 21, 2000.

(51) Int. Cl.
*G06F 7/50* (2006.01)
*G06F 7/38* (2006.01)

(52) U.S. Cl. .................................. 708/670; 708/490
(58) Field of Classification Search ................ 708/491, 708/670, 710–713
See application file for complete search history.

(56) References Cited

U.S. PATENT DOCUMENTS 3,925,652 A * 12/1975 Miller .................. 708/711
4,598,266 A *  7/1986 Bernardson .......... 341/106

* cited by examiner

*Primary Examiner*—Tan V. Mai
(74) *Attorney, Agent, or Firm*—Gordon E. Nelson

(57) ABSTRACT

A parallel-prefix modulo $2^n-1$ adder that is as fast as the fastest parallel prefix $2^n$ integer adders, does not require an extra level of logic to generate the carry values, and has a very regular structure to which pipeline registers can easily be added. All nodes of the adder have a fanout ≦2. In the prefix structure of the adder, each carry value term output by the parallel prefix structure is determined by the all of the bits in the operands input to the adder. In one embodiment, there are $\log_2 n$ stages in the prefix structure. Each stage has n logical operators, and all of the logical operators in the prefix structure are of the same kind. Pipeline registers may be inserted before and/or after a stage in the prefix structure.

30 Claims, 3 Drawing Sheets

HIGH-SPEED PARALLEL-PREFIX MODULO 2N-1 ADDERS

CROSS REFERENCES TO RELATED APPLICATIONS

The present patent application claims priority from U.S. provisional patent application 60/219,856, L. Kalampoukas, et al., High-speed parallel prefix modulo $2^n-1$ adders, filed Jul. 21, 2000.

BACKGROUND OF THE INVENTION

1. Field of the Invention

The invention relates to hardware adder circuits generally and more specifically to adders in which the carry computation is treated as a prefix problem.

2. Description of Related Art

Modulo $2^n-1$ adders are used in various applications, ranging from applications involving residue number systems (RNS) and applications involving fault-tolerant computer systems through cryptographic applications.

Beginning with the applications involving residue number systems, in RNS logic, each operand is represented by its moduli with respect to a set of numbers comprising the base. None of the numbers of the base may have a common factor with any of the other numbers of the base. Moreover, separate hardware units perform operations in parallel on the numbers in the base, and in order to keep the differences in delay among the units as small as possible, the numbers of the base are chosen to be as close in magnitude to each other as possible. Thus, the base is most often three integers, $2^n-1$, $2^n$, and $2^n \pm 1$ and addition is done using three adders, a modulo $2^n-1$ adder, a modulo $2^n$ adder, and a modulo $2^n+1$ adder.

In fault-tolerant computer systems, modulo adders are used for implementing residue, inverse residue, and product (AN) arithmetic codes. In low-cost implementations of systems for handling such codes, modulo $2^n-1$ adders are used both in encoding and to implement various arithmetic operations on the encoded operands.

An important part of designing any hardware adder is designing the circuitry that performs the carry computation and generation operation. The primary objective is speed, and that can be attained by reducing the number of inputs to the gates, reducing the maximum fan-out of the circuit, and avoiding elements that make the circuit into an asynchronous sequential circuit. A secondary objective is regularity of circuit structure, which vastly improves the testability and performance of the design and provides bounded signal propagation delays from inputs to outputs and thereby reduces design time and cost.

Ways of designing the carry circuit include traditional end-around carry schemes, carry look-ahead adders, and schemes which treat carry generation in binary addition as a prefix problem.

Where the prefix computation is done in parallel, the result is a parallel-prefix adder. The $2^n-1$ adder disclosed herein is a parallel-prefix adder.

In prefix problems generally, n inputs (suppose $x_{n-1}, x_{n-2}, \ldots, x_0$) and an associative operator "o" are used for computing n outputs (suppose $y_{n-1}, y_{n-2}, \ldots, y_0$) according to the relation $$y_i = x_i o x_{i-1} o \ldots o x_0 \text{ for } i=0, \ldots, n-1.$$

Carry computations can be treated as prefix problems by using the following associative operator o, where g is the carry generate term and p is the carry propagate term:

$$(g_m, p_m) o (g_k, p_k) = (g_m + p_m \cdot g_k, p_m \cdot p_k)$$

Note that o is not a commutative operator, since its left argument is treated differently from its right argument.

Next, g and p need to be defined in terms of the inputs to the adder circuits. Let $a_{n-1} a_{n-2} \ldots a_0$ and $b_{n-1} b_{n-2} \ldots b_0$ denote two 12-bit input operands. Then the carry generate term $g_i$ and the carry propagate term $p_i$ are defined for $i=0,1,\ldots,n-1$ as:

$$g_i = a_i \cdot b_i$$

$$p_i = a_i + b_i$$

Notice that $p_i$ could also be defined as $p_i = a_i \oplus b_i$, with $\oplus$ representing the exclusive OR operation. With these definitions of g and p, the carry bit $c_i$ for each bit position i obeys the relation $c_i = G_i$, where $$(G_i, P_i) = \begin{cases} (g_0, p_0), & \text{if } i = 0, \\ (g_i, p_i) o (G_{i-1}, P_{i-1}), & \text{if } 1 \le i \le n-1. \end{cases} \quad (1)$$

After the carry $c_i$ has been computed as set forth above, the sum bits $s_i$ for the results of the addition can be computed as:

$$h_i = a_i \oplus b_i, s_i = h_i \oplus c_{i-1}.$$

Notice that by definition $c_{-1} = c_{n-11}$.

The parallel prefix adders which are the subject of the present discussion can be represented as shown in FIG. 1. In both FIG. 1 and FIG. 2, parentheses are used in place of subscripts. Thus, c(i) is equivalent to $c_i$. The adder is represented as a directed acyclic graph, where the shape of each node of the graph indicates a logic operator. The node performs the operation on its inputs that is indicated by the operator. The operators of interest are indicated at the top of the figure. Thus, a square node represents logic operator 101; a black circle represents logic operator 103; and a diamond represents logic operator 105.

Any structure that implements a prefix adder which does not receive a carry input (or equivalently, the input carry c(in) is 0) can be represented as shown at 107. Each of the nodes at position i at 109 receives 1 bit from each of the operands, a(i) and b(i), and performs the first computation step involved in a binary addition operation on the operands. The result at location i in row 109 is the output h(i), which indicates the value at that bit position resulting from the application of operands a(i) and b(i) to the logic operators at row 109, the output g(i), which indicates whether a carry of 1 is to be generated, and the output p(i), which indicates whether the carry is to be propagated. These outputs go to prefix structure 111, which is a tree structure that does the parallel carry computation. Details of the prior-art tree structures can be found at R. Zimmerman, "Binary adder architectures for Cell-based VLSI and their Synthesis", Ph.D. Thesis, Swiss Federal Institute of Technology, Zurich, 1997, available at http://www.iis.ee.ethz. Prefix structure 111 computes the carry value c(i) for each bit position from the g(i)'s and p(i)'s produced by row 109 and outputs it to row 113. The h(i)'s computed at row 109 are also inputs to row 113. At 107 the h(i) inputs to row 113 are represented by dotted lines. Row 113 then produces as its output the result, s(i) for each bit position i.

If a $2^n$ parallel prefix adder is to receive a carry input c(in), it can be modified as shown at 115: an extra stage of logic operators 117 is added which receives not only the c(i) outputs produced by prefix structure 111 at each bit position i, but also the carry value c(in). Further, as shown in R.

Zimmerman, "Efficient VLSI implementation of Modulo ($2^n\pm1$) Addition and Multiplication", *Proc. 14th IEEE Symp. Computer Arithmetic*, pp. 158–167, April, 1999, a $2^n$ parallel prefix adder 115 can be transformed into a modulo $2^n-1$ adder by using the $G_{n-1}$ result from the prefix structure as c(in) to stage 117. Both versions of adder 115 operate in two cycles: in the first cycle, a regular addition takes place. During the second cycle, c(in) is added to the result c(n−1), c(n−2), . . . , c(1), c(0) produced by the prefix structure in the first cycle. Disadvantages of adder 115 include the two-cycle operation, the extra logic stage 117, and the fact that c(in) has a fan-out of ii. It is an object of the invention disclosed herein to overcome these and other disadvantages of existing modulo $2^n-1$ adders.

SUMMARY OF THE INVENTION

Disadvantages of the existing modulo $2^n-1$ adders are overcome in a modulo $2^n-1$ parallel-prefix adder in which the prefix structure includes a plurality of logical operators and receives $g_{0\,\ldots\,(n-1)}$ carry generate terms and $p_{0\,\ldots\,(n-1)}$ carry propagate terms and determines each of the carry value terms $c^*_{(-1\,\ldots\,(n-2))}$ from all of the $g_{0\,\ldots\,(n-1)}$ carry generate terms and $p_{0\,\ldots\,(n-1)}$ carry propagate terms. The prefix structure further determines each of the carry value terms according to the associative relation $(G^*_i,P^*_i)=(g_i,p_i)o(g_{i-1},p_{i-1})o\,\ldots\,o(g_0,p_0)o(g_{n-1},p_{n-1})o\,\ldots\,o(g_{i+1},p_{i+1})$, where o is the logical operator and $c^*_i=G^*_i$.

Embodiments of the prefix structure may have a plurality of stages, a stage j having n logical operators o, $1\leq j\leq \log_2(n)$, each logical operator $o_i$, $0\leq i\leq n-1$ in the stage j receiving a pair of inputs $[g_{in\_1}(i,j-1),p_{in\_1}(i,j-1)]$, $[g_{in\_2}(k,j-1),p_{in\_2}(k,j-1)]$, $i\neq k$ and $k=(n-2^{(j-1)}+i)\%\,n$, where % is the modulo arithmetic operator, and outputting a carry generate term $g_{out}(i,j)$ and a carry propagate term $p_{out}(i,j)$.

Important characteristics of the prefix structure include the characteristic that all of the logical operators in the prefix structure perform the same logical operation, the characteristic that adders using the prefix structure do not require an additional stage to handle a carry input received from the prefix structure, the characteristic that the prefix structure can be used to construct modulo $2^n-1$ adders in which none of the logical operators in the adder has a fan-out of more than 2, and the characteristic that registers for pipelining may be added between any of the stages of the prefix structure.

Adders using the prefix structure may be constructed with the property that they output the result 0 either when both input operands are all 1's or when one operand is the complement of the other. The adders may further be easily modified to output the result 0 only when one operand is the complement of the other.

Adders according to the invention may be employed in any device which uses module $2^n-1$ adders.

Other objects and advantages will be apparent to those skilled in the arts to which the invention pertains upon perusal of the following Detailed Description and drawing, wherein:

Figure 1:
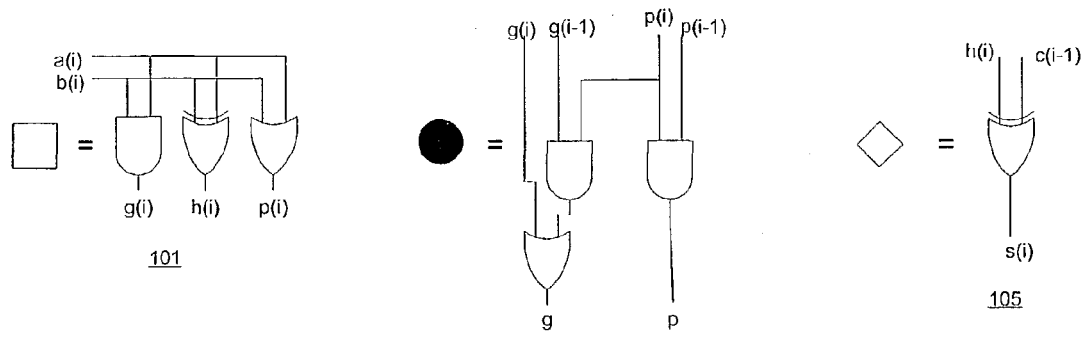
FIG. 1 shows prior-art parallel-prefix adders.
Figure 1:
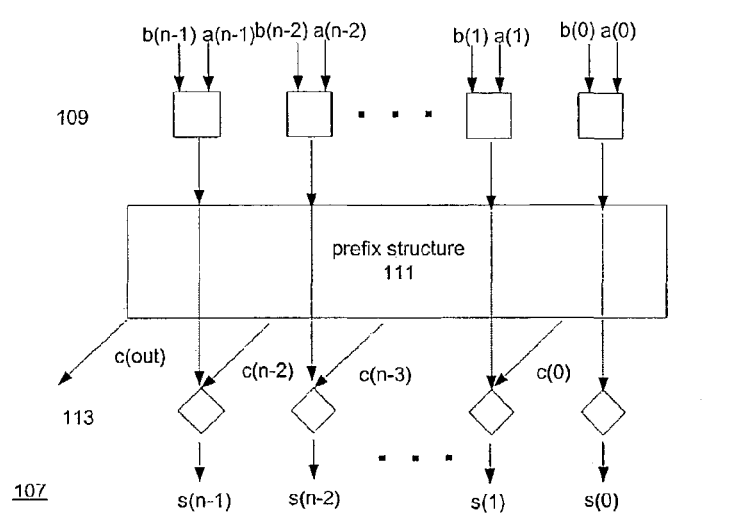
Figure 1:
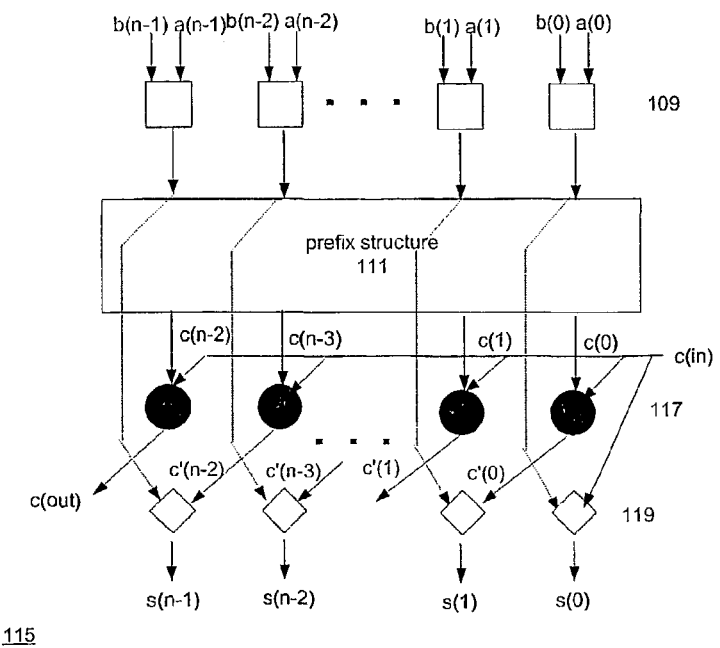

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will disclose a new architecture for modulo $2^n-1$ adders. Adders built according to the new architecture operate at higher speeds, have a regular layout based on operators 101, 103, and 105, and each node has a fan-out that is $\leq 2$. Thus, VLSI or other custom implementations do not have to resort buffer insertion in order to equalize propagation delays and balance capacitive load applied to the outputs of various nodes. The adders of the architecture can be used in any application in which a modulo $2^n-1$ adder may be employed. This includes without limitation ones (1's) complement adders, 1's complement checksum computing engines, or increment or decrement logic with a programmable increment/decrement step. The discussion will begin with a formal derivation of the new architecture, will then disclose a modulo $2^n-1$ adder for n=8 that is built according to the new architecture, and will finally compare adders built according to the new architecture with previously-known adders.

Derivation of the Architecture

Beginning with the formal derivation of the new architecture, it can be proven that the following relation holds with regard to the group generate term $G^*_i$ and the group propagate term $P^*_i$:

$$(G^*_i,P^*_i)=(g_i,p_i)o(g_{i-1},p_{i-1})o\,\ldots\,o(g_0,p_0)o(g_{n-1},p_{n-1})o\,\ldots\,o(g_{i+1},p_{i+1}) \qquad (2)$$

For details of the proof, see the inventors' paper, "High-Speed Parallel-Prefix Modulo $2^n-1$ Adders", IEEE Transactions oil Computers, vol. 49, No. 7, July, 2000.

Relation (2) shows that modulo $2^n-1$ addition can be implemented if for each bit position i $(-1\leq i\leq n-2)$ the group generate and propagate terms $G^*_i$ $(=c^*_i)$ and $P^*_i$ are respectively functions, using the operator o, not only of the propagate and generate terms from 0 through i, but also of the terms from i+1 through n−1. In such an implementation, the carry computation occurs in parallel. Because this is the case, the feedback of P and G signals required for performing the modulo $2^n-1$ addition can be done at each existing prefix level, instead of adding an additional level of logic and providing the feedback there, as is done in architecture 115. Since the extra level is not needed, the new architecture is faster and has more regular structure than architecture 115.

Notice that Eq. (2) consists of n operands and (n−1) operators o. Eq. (2) allows a great deal of flexibility in the way that $G^*_i$ is computed. Some of this flexibility is attributed to the associative property of operator o which can be defined as:

$$[(g_i,p^*_i)o(g_j,p_j)]o[(g_k,p_k)o(g_l,p_l)]=[[[(g_i,p_i)o(g_j,p_j)]o(g_k,p_k)]o(g_l,p_l)] \qquad (3)$$

This characteristic property allows operators o to be executed in arbitrary order as long as the left and right ordering of the operands applied to each operator is preserved. The direct implication of this property is that the o operations can be executed in arbitrary sequences and groupings. Thus, a given implementation may use one sequence of execution that optimizes the complexity of the circuit area that implements the adder, while another may use another sequence of execution that optimizes for speed.

The example implementation shown in 201 optimizes the speed of the adder. Furthermore, it is understood that a given implementation might group and/or represent the operands g and p in various other forms (possibly by grouping them differently and performing logic optimizations) while still exploiting the fundamental property of associativity.

Further performance enhancements may be trivially accomplished through minor modification to the 201 design: because of the regularity in the structure of the adder, we can incorporate pipeline stages before or after any of the stages (109, 205, 209, 213) in 201. The presence of a given pipeline stage after one of the adder stages shown in 201 is independent of the presence or absence of any of the other pipeline stages. Whether to insert a pipeline stage is based solely on optimization criteria.

Example Implementation

Figure 2:
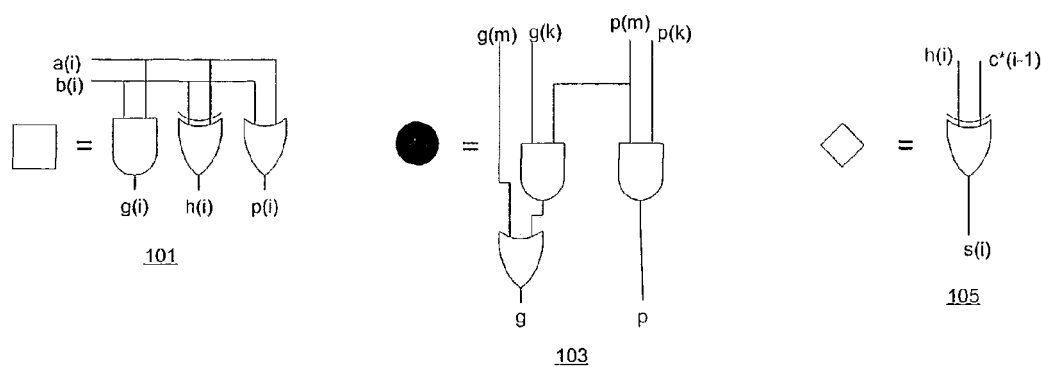
FIG. 2 shows a $2^8-1$ embodiment of the parallel-prefix adder of the invention.
Figure 2:
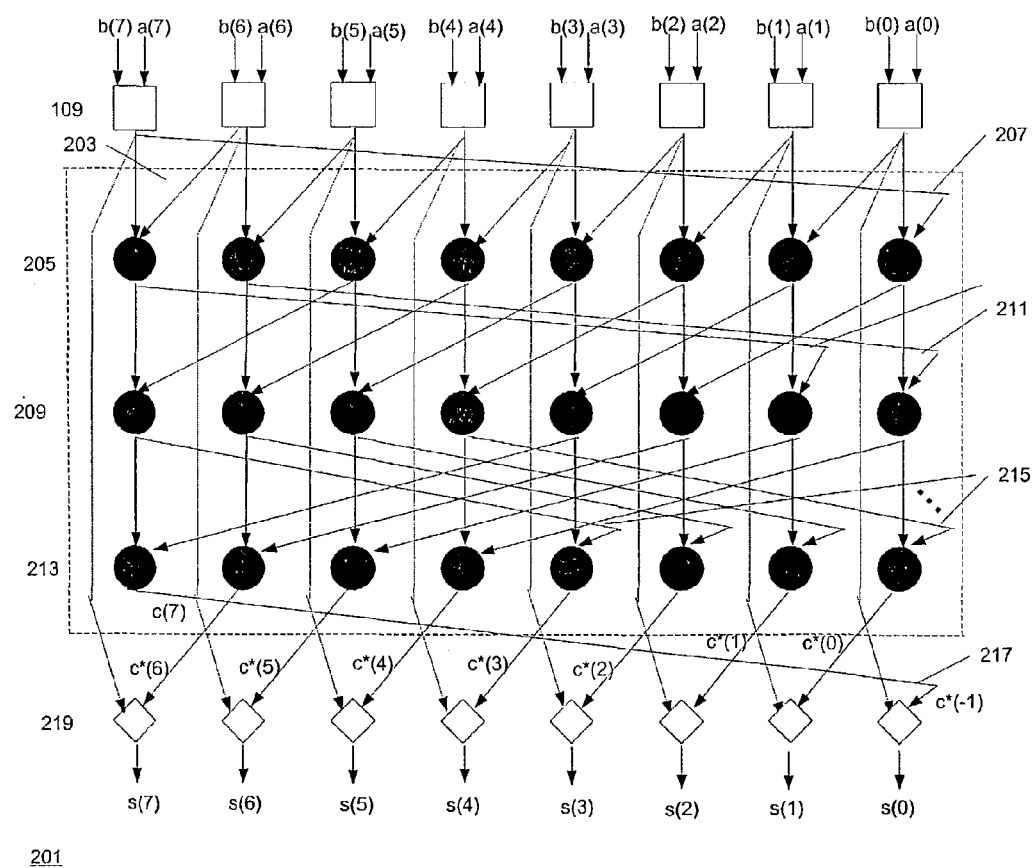

FIG. 2 shows one of the possible implementations of a modulo $2^8-1$ adder 201 that is made according to the architecture specified by the relation (2). The same notation is used in FIG. 2 as was used in FIG. 1. In operator 101, p, $a_i + p_i$, and $h_i = a_i \oplus b_i$. Relation (2) shows itself in prefix structure 203 in the fact that at every stage m, with $1 \leq m \leq \log_2 n$, the (g,p) output terms of the highest order $2^{m-1}$ operators of the previous stage are also fed to the lowest order $2^{m-1}$ operators of stage m. Since $\log_2 8 = 3$, adder 201 has three stages. In stage 1 205, the lowest-order operator 103 receives the (g,p) output terms from the highest-order 109 node, as indicated by arrow 207, and thus has the inputs [(g0,p0), (g7,p7)]. In stage 2 209, the 2 lowest-order nodes 103 in the stage receive the (g,p) output terms from the two highest-order nodes in stage 1 205 respectively, as indicated by arrows 211. In stage 3 213, finally, the four lowest-order nodes 103 of the stage receive the (g,p) output terms from the four highest-order nodes in stage 2 209, as indicated by arrows 215. The $G^*_i$ outputs from the operators 103 in stage 3 are the carry $c^*_i$ inputs to the operators 105 in row 219. These operators w, are now described as follows: each each operator w, produces an output s1 according to the relation $s_i = h_i \oplus c^*_{i-1}$ for $i \neq 0$ and $s_0 = h_0 \oplus c^*_{n-1}$ for $i=0$.

That the foregoing arrangement does satisfy relation (2) can be seen from a consideration of the g and p outputs of row 109 that determine the output $c^*_0$ of the prefix structure 203 In the following discussion, each node will be indicated by the number used in FIG. 2 to indicate its stage and its position, ranging from 0 to 7, in the stage, beginning at the right. An input from a node will be indicated by the name of the input and the position of the node. Thus, the inputs to node 205(0) are determined by the g and p outputs of nodes 109(0) and 109(7), and the inputs are (g(109,0), p(109,0)), and (g(109,7), p(109,7)). The inputs to node 209(0) are determined by the aforementioned g and p outputs (via node 205(0)) and by the g and p outputs of nodes 109(6) and 109(5) (via node 205(6)). Inputs to node 213(0) are determined by the foregoing outputs of nodes 109(0) and 109(5-7) (via node 209(0)) and by g and p outputs of nodes 109(1) through 109(4). The effect of the later sets of g and p inputs to node 213(0) is via nodes 209(4), 205(2), and 205(4). It is important to observe in this example that each one of the g and p outputs of stage 213 depend on all g(i) and p(i) outputs of stage 109. The differentiating factor in the computation process is the order in which the o operations are executed. As may be seen from the foregoing, a given node in stage 213 is linked by a tree-like structure to all of the a(i) and b(i) inputs of the adder.

The general rule for the relationship between the nodes in a given stage j of a prefix structure and the nodes in the preceding stage j−1 may be given as follows: each stage j has n logical operators o, $1 \leq j \leq \log_2(ii)$ and each logical operator $o_i$ at bit position i, $0 \leq i \leq n-1$ in the stage j receives a pair of inputs $[g_{in\_1}(i,j-1), p_{in\_1}(i,j-1)]$, $[g_{in\_2}(k,j-1), p_{in\_2}(k,j-1)]$, $i \neq k$ and $k=(n-2^{(j-1)}+i) \%$ n, where % is the modulo arithmetic operator. The logical operator further outputs a carry generate term $g_{out}(i,j)$ and a carry propagate term $p_{out}(i,j)$ to the next stage j+1.

Adder 201's architecture gives it a number of advantages over prior art adders such as adders 107 and 115. First, adder 201 does not require an extra level of prefix logic to handle c(7) (arrow 217 in FIG. 2). Second, c(7) need only drive one node of type 105, not n of type 103. Third, the entire prefix structure 203 uses a single type of nodes. Fourth, all nodes have a fan-out that is $\leq 2$. This allows for reduced routing complexity and reduced capacitive loading on the outputs of the preceding stage, which results in increased speed of the underlying circuitry. Fifth, the proposed adder has a very regular structure: this allows for easy transformation of the design to make use of and take advantage of a pipelined architecture. The pipelined architecture can result in dramatic performance improvements by reducing the delay of combinational logic placed between successive pipeline stages.

Figure 3:
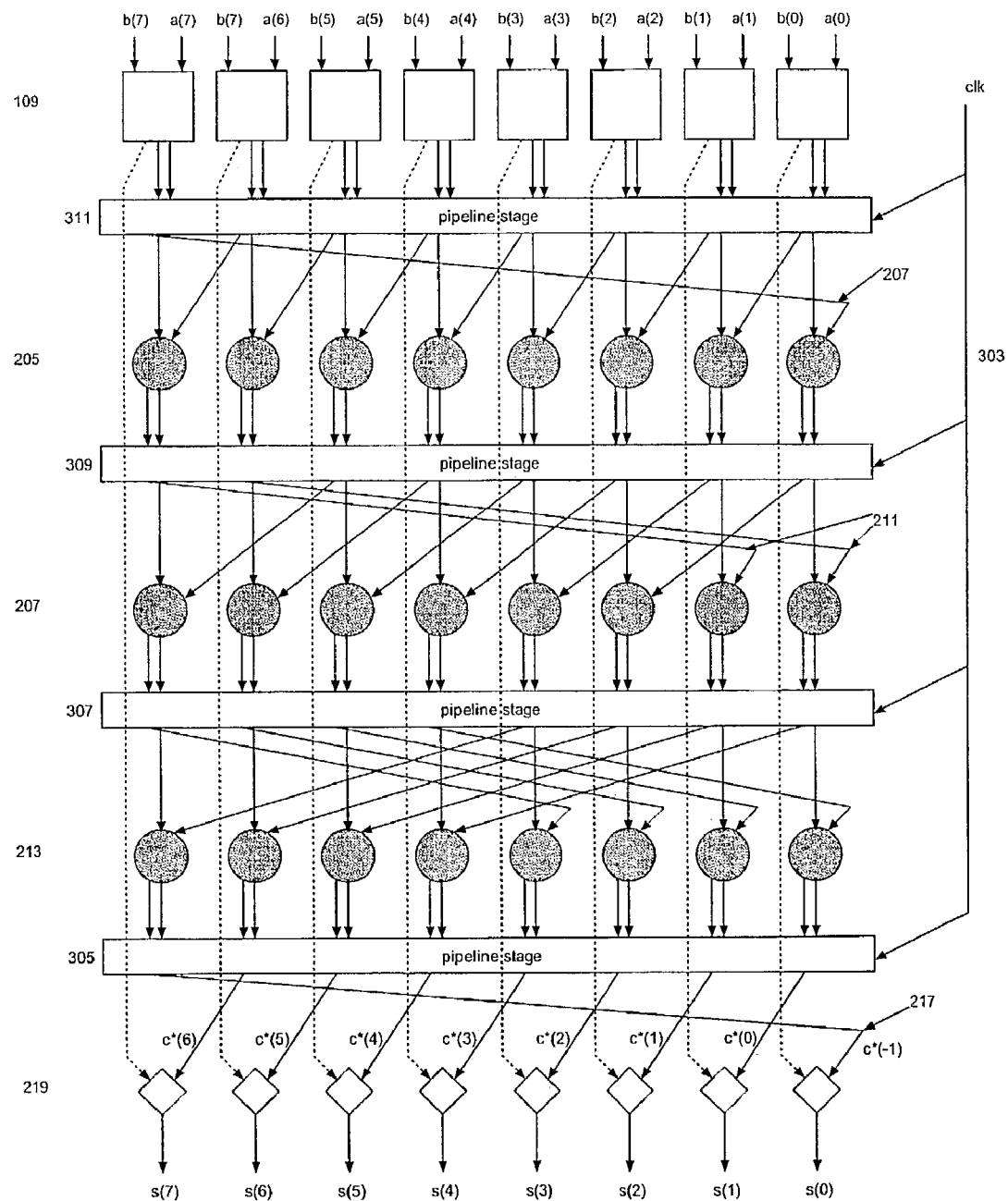
FIG. 3 shows a version of the embodiment of FIG. 2 to which pipeline registers have been added.

FIG. 3 shows a version 301 of adder 201 that includes pipeline registers before and after each of the three stages of prefix structure 203. Pipelining allows us to speed up the clock frequency (and effectively the performance and speed) of the circuitry proportionally to the number of pipeline stages. Since the clock frequency of a circuit is determined by the complexity of logic between two successive pipeline stages, in unpipelined adder 201, the adder's operating frequency will depend on the critical path of the logic between input a(i) and b(i) and outputs s(i), that is, before adder 201 can accept new inputs at stage 109, the outputs of stage 219 must have stabilized with the results from the previous inputs at stage 109. If a pipeline register is inserted after a stage of adder 201, the stage that has the register following it can accept new inputs as soon as the stage's outputs have been latched into the register. If the stage also has a pipeline register preceding it, the results of the previous stage's operations will be available as fast as the stage can take them. Thus, when a stage is preceded and followed by a pipeline register, the frequency at which the stage can operate depends only on the logic between two successive pipeline stages, i.e., the logic in a node 205. If all of the stages are pipelined, the adder can run at a frequency which is close to that of the slowest stage. The only cost of the pipeline is the additional space required for the pipeline registers and the signals associated with it.

Continuing in more detail with version 301, a pipeline register such as pipeline register 311 has a latch for each of the $p_i$ and $g_i$ signals produced by the preceding stage, here stage 109. The signals are latched under control of clock signal 303. The next stage, here stage 205, receives its inputs from the latch, and can access those inputs as soon as they are latched into register 311. The outputs of stage 205 are similarly latched into pipeline register 309. Stage 205 can accept new inputs from register 311 as soon as it has output its results to pipeline register 309. All of the stages work in the same fashion, and thus, version 301 of the adder can work on different stages of four addition operations simultaneously, with pipeline register 311 holding the first-stage results of the most recently-input addition operation, pipeline register 309 holding the second-stage results of the second most recently-input addition operation, pipeline register 307 holding the third-stage results of the third most recently-input addition operation, and pipeline register 305 holding the results of the fourth most recently-input addition operation. There are of course many different ways in which the pipelining may be implemented. For example, in FIG. 3, the output of each node of a stage goes directly to the pipeline register and any necessary rerouting of signals to nodes in the next stage is done with the outputs of the pipeline register, but the rerouting could also be done with the inputs to the pipeline register, with the outputs then going directly to the proper nodes of the following stages. Similarly, there may be different numbers of pipeline registers, with speed in general increasing until each stage of the prefix structure is preceded and followed by a pipeline register.

Adders designed according to the architecture of relation (2) support two representations of the value 0, all 0's and all 1's. This is consistent with the $2^n-1$ arithmetic system (also known as 1's complement arithmetic system) that defines two representations for number 0: the all 1's and the all 0's. In some applications of $2^n-1$ adders, this characteristic is advantageous; where it is not, the architecture can be easily modified so that it has a single representation of 0. A modification of the architecture to produce all 1's only where the input operands are complementary begins with the observation that where the inputs are complementary, the output $h_i=1$ for each of the nodes 109 and the output $c^*_i=0$ ($c^*_i=G^*_i$) for each of the nodes 213. Thus, to avoid the 0=all 1's output, one can produce the final sum as $s_i=(h_i \oplus K' \oplus c^*_{i-1}$ for $0 \leq i \leq n-1$ where $K=h_1 \cdot h_2 \cdot \ldots \cdot h_{n-1}$ and $K'$ is the complement of K. The computation of K can be done separately and in parallel with the prefix computation. A slightly simpler way to reach to the same result is based on the observation that when the inputs $a_i$ and $b_i$ are complementary, then $c^*_{i-1}=0$ as well.

Performance Comparison

Performance comparisons were made with the fastest known parallel prefix modulo $2^n-1$ adders, with parallel prefix integer adders, and with carry look-ahead (CLA) modulo $2^n-1$ adders. The parallel prefix integer adders were made using a Slanlsky prefix structure, described in J. Slansky, "Conditional sum addition logic," *IRE Trans. Electronic Computers*, vol. 9, no. 6, pp. 226–231, June 1960. The parallel prefix modulo $2^n-1$ adders are made as shown at 115 in FIG. 1, with prefix structure 111 being either the Slansky prefix structure or a Kogge-Stone prefix structure, described in P. M. Kogge and H. S. Stone, "A Parallel Algorithm for the Efficient Solution of a General Class of Recurrence Equations," *IEEE Trans. Computers*, vol. 22, no.8, pp. 783–791, August 1973. The CLA adders are described in C. Efstathiou, D. Nicolos, and J. Kalaniatianos, "Area-time Efficient Module $2^n-1$ Adder Design", *IEEE Trails. Circuits and Systems-II: Analog and Digital Signal Processing*, vol. 41, no.7, pp. 463–467, July 1994. Comparisons were made using a model described in A. Tyagi, "A Reduced-Area Scheme for Carry-Select Adders", *IEEE Trans. Computers*, vol. 42, no. 10, pp. 1,163–1,170, October 1993, and using simulations of actual static CMOS implementations of the adders.

The comparisons made using the model compared parallel prefix modulo $2^n-1$ adders made according to the architecture disclosed herein with the Slansky parallel prefix integer adder and the Slansky and Kogge-Stone parallel prefix modulo $2^n$-1 adders made as shown at 115. The results showed that the adders made according to the new architecture are faster than the Slausky and Kogge-Stone parallel prefix modulo $2^n-1$ adders and are as fast as the Slansky parallel prefix integer adder. The fact that the new adders are as fast as the fastest parallel prefix integer adders makes them ideal for RNS applications.

In terms of size, the adders made according to the new architecture are about the same size as parallel prefix modulo $2^n-1$ adders made using the Kogge-Stone prefix structure and larger than the adders made with the Slansky prefix structure. The model does not, however, take into account the extra space that may be needed in the Slansky prefix structure for buffers to deal with the Slansky structure's property that fan-out increases as n increases or the extra space that may be needed for the more complex interconnections required by the Kogge-Stone prefix structure.

The results of the simulations of static CMOS implementations confirmed those of the model. The designs were made and simulated using the Synoposys tools and the AMS CUB implementation technology (0.6 μm, 2-metal layer, 5.0V). Two different design approaches were simulated. The first was a bottom-up approach that aimed at netlist regularity. The design tool was instructed to leave the basic building blocks untouched. With this approach, the adders made according to the new architecture are 14.7% faster than ones made using the Kogge-Stone prefix structure, 11.8% faster than ones made using the Slansky prefix structure, and 10.1% faster than the CLA adders. The new adders require about the same area as the ones using the Kogge-Stone prefix structure, but are 34.5% larger than the ones made using the Slansky prefix structure and 105.7% larger than the CLA adders.

The second design approach removed the "don't touch" restriction, which resulted in a flattened netlist. The design tool was further instructed to optimize the flattened netlist for speed and to recover as much area as possible. With this approach, the adders made according to the new architecture are 16.2% faster than ones made using the Kogge-Stone prefix structure, 16% faster than ones made using the Slansky prefix structure, and 28.1% faster than the CLA adders. The new adders require 15.5% more area than the ones using the Kogge-Stone prefix structure, 50.6% more area than the ones using the Slansky prefix structure, and 27.5% more area than the CLA adders.

CONCLUSION

The foregoing Detailed Description has described to those skilled in the relevant technologies how to make and use a parallel-prefix modulo $2^n-1$ adder according to a new architecture. Adders made according to the new architecture are as fast as the fastest parallel prefix integer adders, do not require an extra level of logic following the prefix structure to compute the carry, use only a single type of logical operator in the prefix structure, do not require any node to have a fan-out greater than 2, and may be easily pipelined by addition of pipeline registers between the levels of the prefix structure. The inventors have disclosed the best mode presently known to them of constructing adders according to their new architecture and have provided a detailed example of a parallel-prefix modulo $2^8-1$ adder that is constructed according to the architecture.

It will, however, be immediately apparent to those skilled in the relevant technologies that there are many present and future ways of constructing adders according to the new architecture other than the exemplary implementation disclosed herein and that it is indeed an important advantage of the new architecture that adders constructed according to the new architecture may be implemented in a large number of different ways. Since that is the case, the Detailed Description is to be regarded as being in all respects exemplary and not restrictive, and the breadth of the invention disclosed herein is to be determined not from the Detailed Description, but rather from the claims as interpreted with the fill breadth permitted by the patent laws.

What is claimed is:

1. A parallel-prefix modulo $2^n-1$ adder,
the adder having the improvement comprising:
a prefix stricture that includes a plurality of logical operators and receives $g_0 \ldots _{(n-1)}$ carry generate terms and $p_0 \ldots _{(n-1)}$ carry propagate terms and determines each of the carry value terms $c^*_{(-1 \ldots (n-2))}$ from all of the $g_0 \ldots _{(n-1)}$ carry generate terms and $p_0 \ldots _{(n-1)}$ carry propagate terms.

2. The adder set forth in claim 1 wherein:
the prefix structure determines each of the carry value terms according to the associative relation $$(G^*_i,P^*_i)=(g_i,p_i)o(g_{i-1},p_{i-1})o \ldots$$
$$o(g_0,p_0)o(g_{-1},p_{n-1})o \ldots o(g_{i+1},p_{i+1}),$$

where o is the logical operator and $c^*_i=G^*_i$.

3. The adder set forth in claim 2 wherein the prefix structure comprises:
a plurality of stages, a stage j having n logical operators o, $1 \leq j \leq \log_2(n)$, each logical operator $o_i$ at bit position i, $0 \leq i \leq n-1$ in the stage j receiving a pair of inputs $[g_{in\_1}(i,j-1),p_{in\_1}(i, j-1)]$, $[g_{in\_2}(k,j-1),p_{in\_2}(k, j-1)]$, $i \neq k$ and $k=(n-2^{(j-1)}+i)\%$ z, where % is the modulo arithmetic operator, and outputting a carry generate term $g_{out}(i,j)$ and a carry propagate term $p_{out}(i,j)$.

4. The adder set forth in claim 3 wherein the prefix stricture further comprises:
a pipeline register that receives outputs from a stage j-1 and provides inputs to a stage j.

5. The adder set forth in claim 4 wherein:
there is a plurality of the pipeline registers, with a stage of the prefix structure being preceded by a pipeline register and followed by another pipeline register.

6. The adder set forth in claim 3 wherein:
the number of stages in the plurality is $\log_2$ n.

7. The adder set forth in claim 3 wherein:
the adder has an operand input receiving stage with n, operators u;
each operator $u_i$ produces a pair $(g_i,p_i)$ of the carry generate and carry propagate inputs and an output $h_i$ from inputs $a_i$ and $b_i$ according to the relation $g_i=a_i \cdot b_i$, and $p_i$ defined either as $p_i=h_i=a_i \oplus b_i$ or $p_i=a_i+b_i$.

8. The adder set forth in any of claims 1 through 3 wherein:
the adder has an operand input receiving stage and a result producing stage in addition to the prefix structure and does not require an additional stage to handle a carry input received from the prefix structure.

9. The adder set forth in any of claims 1 through 7 wherein:
all of the logical operators in the prefix structure perform the same logical operation.

10. The adder set forth in claim 9 wherein:
when inputs $(g_{in\_1}, p_{in\_1}), (g_{in\_2}, p_{in\_2})$ are applied to the logical operators in the prefix structure, they produce the output pair $(g_{out},p_{out})$ according to the relations $g_{out}(g_{in\_1}+p_{in\_1} \cdot g_{in\_2})$ and $p_{out}=(p_{in\_1} \cdot g_{in\_2})$.

11. The adder set forth in any of claims 1 through 6 wherein:
the adder has an operand input receiving stage and a result producing stage made up of logical operators in addition to the prefix structure; and
none of the logical operators in the adder has a fan-out of more than two.

12. The adder set forth in any of claims 1 through 6 wherein:
the adder has an operand input receiving stage and a result producing stage in addition to the prefix structure and the result producing stage outputs the result 0 either when both operands received in the input receiving stage are all 1's or when the operands received in the input receiving stage are complementary.

13. The adder set forth in any one of claims 1 through 3 wherein:
the adder has an operand input receiving stage with n operators u, each operator $u_i$ producing a pair $(g_i,p_i)$ of the carry generate and carry propagate inputs and an output $h_i$ from inputs $a_i$ and $b_i$.

14. The adder set forth in claim 13 wherein:
the adder has a result producing stage with n operators w; and
each operator $w_i$ produces an $s_i$ according to the relationship $s_i=h_i \oplus K' \oplus c^*_{i-1}$ for $0 \leq i \leq n-1$ where $K=h_1 \cdot h_2 \cdot \ldots \cdot h_{n-1}$, and K' is the complement of K and where $h_i=p_i=a_i \oplus b_i$.

15. The adder set forth in claim 3 wherein:
the adder has an operand input receiving stage with n operators u, and a result producing stage with n operators w;
each operator $u_i$ produces a pair $(g_i,p_i)$ of the carry generate and carry propagate inputs and an output $h_i$ from inputs $a_i$ and $b_i$ according to the relation $g_i=a_i \cdot b_i$, $h_i=a_i \oplus b_i$; and $p_i$ is defined as either $p_i=h_i=a_i \oplus b_i$ or $p_i=a_i+b_i$; and
each operator $w_i$ produces an $s_i$ according to the relation $s_i=h_i \oplus c^*_{i-1}$ for $i \neq 0$ and $s_0=h_0 \oplus c^*n-1$ for i=0.

16. A device that includes a modulo $2^n-1$ adder, the device being characterized in that:
the adder is the adder set forth in any one of claims 1 through 11 or in claim 15.

17. A modulo $2^n-1$ adder comprising:
a set of $u_0 \ldots _{n-1}$ first logical operators, a first operator $u_i$, $0 \leq i \leq n-1$, receiving bit $a_i$ of a first operand $a_0 \ldots _{n-1}$ and a bit $b_i$ of a second operand $b_0 \ldots _{n-1}$ and producing therefrom a carry generate value $g_i$, a carry propagate value $c_i$, and an intermediate value $h_i$;
a prefix structure that receives $g_0 \ldots _{(n-1)}$ carry generate terms and $p_0 \ldots _{(n-1)}$ carry propagate terms from the set of first logical operators and determines each of the carry value terms $c^*_{(-1 \ldots (n-2))}$ from all of the $g_0 \ldots _{(n-1)}$ carry generate terms and $p_0 \ldots _{(n-1)}$ carry propagate terms; and
a set of $w_0 \ldots _{n-1}$ second logical operators, a second logical operator $w_i$ receiving $c^*_{(i-1)}$ from the prefix structure and $h_i$ from $u_i$ and producing a sum $s_i$ therefrom.

18. The adder set forth in claim 17 wherein:
the prefix structure determines each of the carry value terms according to the associative relation $$(G^*_i,P^*_i)=(g_i,p_i)o(g_{i-1},p_{i-1})o \ldots$$
$$o(g_0,p_0)o(g_{n-1},p_{n-1})o \ldots o(g_{i+1},p_{i+1}),$$

where o is the logical operator and $c^*_i=G^*_i$.

19. The adder set forth in claim 18 wherein the prefix structure comprises:

a plurality of stages, a stage j having n logical operators o, $1 \leq j \leq \log_2(n)$, each logical operator $o_i$ at bit position i, $0 \leq i \leq n-1$ in the stage j receiving a pair of inputs $[g_{in\_1}(i,j-1), p_{in\_1}(i,j-1)]$, $[g_{in\_2}(k,i-1), p_{in\_2}(k,j-1)]$, $i \neq k$ and $k=(n-2^{(j-1)}+i) \% n$, where % is the modulo arithmetic operator, and outputting a carry generate term $g_{out}(i,j)$ and a carry propagate term $p_{out}(i,j)$.

20. The adder set forth in claim 19 wherein the prefix structure further comprises:

a pipeline register that receives outputs from a stage j−1 and provides inputs to a stage j.

21. The adder set forth in claim 20 wherein:

there is a plurality of the pipeline registers, with a stage of the prefix structure being preceded by a pipeline register and followed by another pipeline register.

22. The adder set forth in claim 19 wherein:

the number of stages in the plurality is $\log_2 n$.

23. The adder set forth in claim 19 wherein:

each operator $u_i$ produces the pair $(g_i, p_i)$ of the carry generate and carry propagate values and the intermediate value $h_i$ from the inputs $a_i$ and $b_i$ according to the relation $g_i = a_i \cdot b_i$, and $p_i$ defined either as $p_i = h_i = a_i \oplus b_i$ or $p_i = a_i + b_i$.

24. The adder set forth in any of claims 17 through 23 wherein;

the adder does not require an additional stage to handle a carry input received from the prefix structure.

25. The adder set forth in any of claims 17 through 23 wherein:

all of the logical operators in the prefix structure perform the same logical operation.

26. The adder set forth in claim 25 wherein:

when inputs $(g_{in\_1}, p_{in\_1})$, $(g_{in\_2}, p_{in\_2})$ are applied to the logical operators in the prefix structure, they produce the output pair $(g_{out}, p_{out})$ according to the relations $g_{out} = (g_{in\_1} + p_{in\_1} \cdot g_{in\_2})$ and $p_{out} = (p_{in\_1} \cdot g_{in\_2})$.

27. The adder set forth in any of claims 17 through 23 wherein:

none of the logical operators in the adder has a fan-out of more than two.

28. The adder set forth in any of claims 17 through 23 wherein:

the adder outputs the result 0 either when both operands received in the input receiving stage are all 1's or when the operands received in the input receiving stage are complementary.

29. The adder set forth in any one of claims 17 through 23 wherein:

each operator $w_i$ produces an $s_i$ according to the relationship $s_i = h_i \oplus K' \oplus c^*_{i-1}$ for $0 \leq i \leq n-1$ where $K = h_1 \cdot h_2 \cdot \ldots \cdot h_{n-1}$ and $K'$ is the complement of $K$ and where $h_i = p_i = a_i \oplus b_i$.

30. The adder set forth in claim 19 wherein:

each operator $u_i$ produces a pair $(g_i, p_i)$ of the carry generate and carry propagate values and an intermediate value $h_i$ from inputs as and $b_i$ according to the relation $g_i = a_i \cdot b_i$, $h_i = a_i \oplus b_i$; and $p_i$ is defined as either $p_j = h_i = a_i \oplus b_i$ or $p_i = a_i + b_i$; and each operator $w_i$ produces an $s_i$ according to the relation $s_i = h_i \oplus c^*_{i-1}$ for $i \neq 0$ and $s_0 = h_0 \oplus c^*_{n-1}$ for $i=0$.

* * * * *